Feb. 9, 1960 YASUSHI HOSHINO ET AL 2,924,668

MAGNETIC RECORDING AND READING APPARATUS

Filed Jan. 22, 1957 6 Sheets-Sheet 1

Feb. 9, 1960 YASUSHI HOSHINO ET AL 2,924,668

MAGNETIC RECORDING AND READING APPARATUS

Filed Jan. 22, 1957 6 Sheets-Sheet 3

MAGNETIC RECORDING AND READING APPARATUS

Filed Jan. 22, 1957

6 Sheets-Sheet 4

Feb. 9, 1960 YASUSHI HOSHINO ET AL 2,924,668

MAGNETIC RECORDING AND READING APPARATUS

Filed Jan. 22, 1957 6 Sheets-Sheet 5

MAGNETIC RECORDING AND READING APPARATUS

United States Patent Office 2,924,668

Patented Feb. 9, 1960

2,924,668

MAGNETIC RECORDING AND READING APPARATUS

Yasushi Hoshino, Minoru Sato, and Mamoru Namikawa, Tokyo, and Shigezo Tochihara, Kawasahi-shi, Japan, assignors to Tokyo Denki Kagaku Kogyo Kabushiki Kaisha, Tokyo, Japan, a corporation of Japan Application January 22, 1957, Serial No. 635,335

Claims priority, application Japan January 25, 1956

15 Claims. (Cl. 179—100.2)

This invention relates to magnetic recording and reading apparatus.

It is an object of the invention to provide improved apparatus for combined visual-audio operations.

The invention contemplates providing magnetic recording and reading apparatus comprising a sheet having on one side a magnetic film and on the other side descriptions, drawings or the like, and a device having a plurality of heads which rotate along the width of the sheet to record sound on the magnetic film or to reproduce the sound recorded on the film at the same time, the device moves in a direction perpendicular to the direction of the width of the sheet thereby scanning the magnetic surface of the sheet to record the magnetic variations occurring in the head or to reproduce the sound recorded on the magnetic film, or to erase the record on the film.

The invention will be understood better by the following description with reference to the accompanying drawings which illustrate some embodiments of this invention in which.

Figure 31:
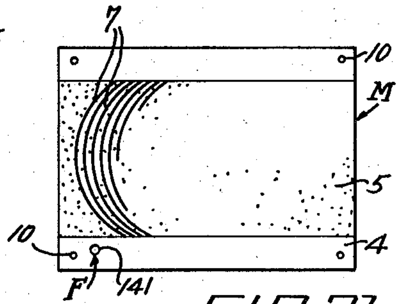
Figure 32:
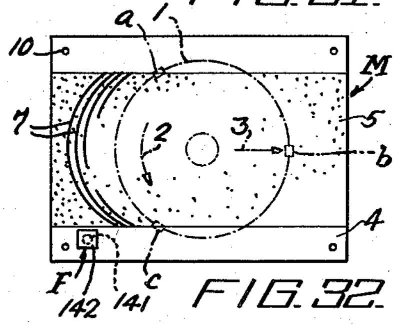
Figure 33:
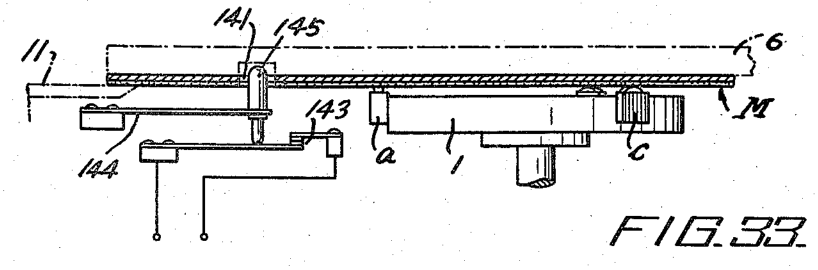
Figure 34:
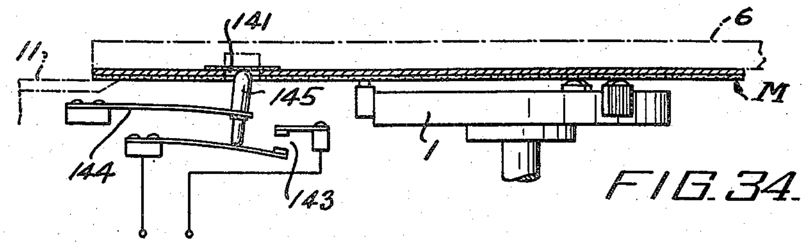

Figs. 31 and 32 are rear views of a sheet having a device for the preventing of erasing or duplication of recording; and Figs. 33 and 34 are front views showing the conditions of operation of the sheet as shown in Figs. 31 and 32.

Figure 1:
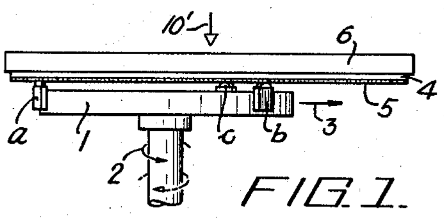
Fig. 1 is a front view of the magnetic recording and reading apparatus of this invention showing the principle of the invention.
Figure 2:
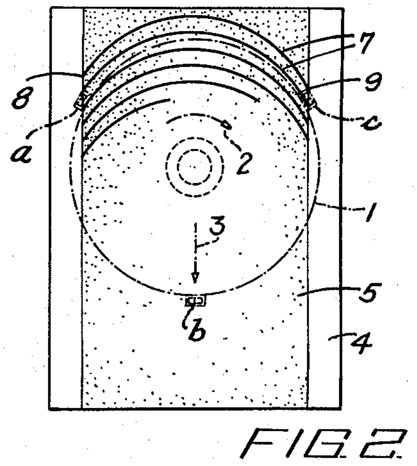
Fig. 2 is a back plan view of the structure of Fig. 1 showing the relation between the recording sheet and the head.

Firstly, the principle of the magnetic recording and reading apparatus of this invention will be explained. In Fig. 1, a rotary body or flat circular disc 1 has a plurality of recording or reproducing heads or transducers *a*, *b*, *c* (three in the drawing) which are fixed on the periphery of said body and spaced from one another by equal distances. Said rotary body is rotated in the direction of the arrow 2 while at the same time it is moved in the direction of the arrow 3. A sheet 4 has a magnetic coating film 5 on one surface and is pressed by a pressing plate 6 on the other surface. The magnetic coating film 5 has a rectangular form and may be pasted or coated on the sheet 4 as shown in Fig. 2. Since the rotary body 1 which constitutes a support for the heads rotates in the direction of the arrow 2 and at the same time moves in the direction of the arrow 3, the starting point 8 and the ending point 9 of the track 7 of the head on the rotary body 1, for example, of the head *a*, are not at the same level and the point 8 will be higher than the point 9 as shown in the drawing. When a sound reproducing head scans the arcuately shaped record recorded by a recording head as described above, the sound is reproduced. According to this invention, when one head comes to the end side of the recording film, the next head comes to the starting side of the film and therefore the recording and reproducing of sound may be effected continuously so long as the film contains tracks. On the other side of the sheet 4, descriptions or drawings are applied by printing or otherwise which correspond to the sound recorded or reproduced and they can be read or seen through a transparent pressing plate 6 from the direction of the arrow 10'. According to the invention, one can thus read or see the description or the drawing while hearing the explanation thereof. This is the principle of the magnetic recording and reading apparatus of this invention.

Next, the device for setting the magnetic recording sheet on the magnetic recording and reading apparatus very speedily and accurately by a simple operation will be explained. Generally, the magnetic recording sheet to be used for the apparatus of this invention has a relatively large width, such as the size of writing paper, but it is of relatively weak mechanical strength, being of a material such as paper. It is necessary to avoid breaking the sheet in setting the same on the apparatus. It is one of the objects of this invention to provide a means which attains a perfect setting of the sheet by a simple operation.

Figure 3:
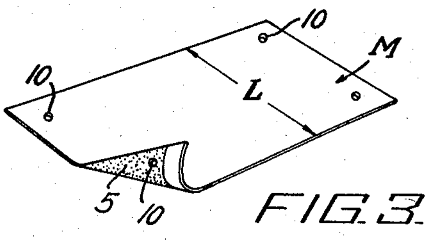
Fig. 3 is a perspective front view of the sheet.

As shown in Fig. 3, the recording sheet M has a relatively large width L and the carrier 4 of the magnetic coating film is made of material such as paper and is provided with guiding holes 10 for setting the sheet on the recording and reading apparatus in correct position. For setting the sheet M on the magnetic recording and reading apparatus, it is essential that the position of the sheet be exactly the same at the time of reproducing as at the time of recording. If this condition is not satisfied, the reproducing head fails in effecting a faithful scanning of the record in reproducing thereby causing bad effects in reproduction of the sound.

Figures 4, 5, 6:
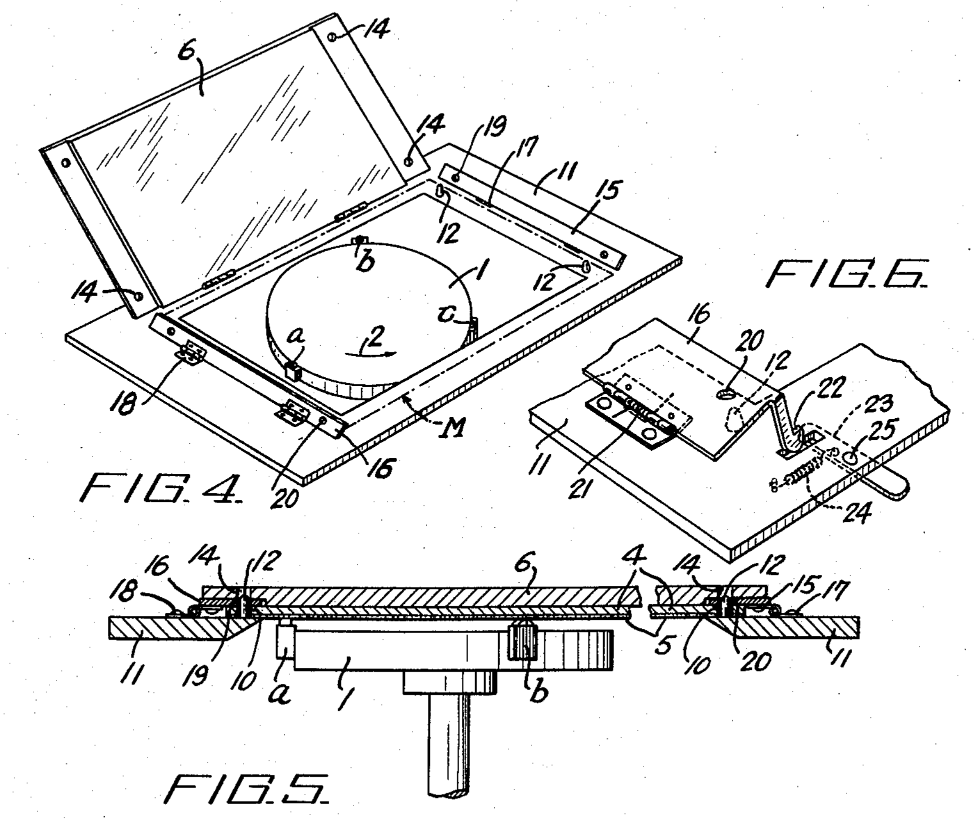
Fig. 4 is a perspective view of the magnetic recording and reading apparatus showing one of the means for setting the sheet on the apparatus.
Fig. 5 is an enlarged longitudinal sectional view of Fig. 4.
Fig. 6 is an enlarged partial perspective view of a detail of Figs. 4 and 5.

In order to overcome these difficulties, as shown in Figs. 4–6, the magnetic recording and reading apparatus has a panel 11 having a window opening and is arranged so as to place the recording sheet M in a fixed plane as shown in Fig. 4 by chain lines on the panel. Body 1 has an axis of rotation perpendicular to this plane. For this purpose, guiding pins 12 are provided on the panel so that the recording sheet M may be placed in an accurately determined position by the engagement of the guiding holes 10 of the sheet M and said guiding pins 12. The pressing plate 6 is hinged on the panel 11 and has holes 14 to allow the passing through of pins 12. This plate is transparent and presses from the top the magnetic recording sheet M when it is in position.

In setting the sheet M on the guiding pins 12 of the panel 11, it is very difficult to attain perfect engagement between all the holes 10 and the pins 12 inasmuch as the holes and pins are numerous while the sheet M, being made of material such as paper or plastic, is thin and flexible. For instance, during the operation of engaging holes on one side of the sheet with the pins, the holes on the other side which have been already engaged with the pins often tend to detach from the pins.

The setting of the sheet is thus very difficult and in some cases the pressing plate might fall down over a recording sheet which has some guiding holes not in engagement with the pins. If this happens, it may cause a serious damage to the recording sheet and may make it utterly useless. In order to avoid such an occurrence, the operator is obliged to pay utmost care.

According to this invention, in order to avoid such a difficulty, holding plates 15 and 16 are provided along the guiding pins 12. The holding plates 15 and 16 are mounted swingably on the panel 11 by hinges 17 and 18 and have holes 19, 20 adapted to accommodate pins 12 when the plates are swung towards the front direction. When the guiding holes 10 on one side of the sheet M are registered with the guiding pins 12 on the panel, the holding plate on this side moves down to keep said side of the sheet M securely in position by the weight of the holding plate. Then the fitting of the guiding holes 10 on the other side of the sheet M on the guiding pins 12 is effected and the holding plate on the other side moves down to secure said side of the sheet by the weight of said holding plate. In this way, a perfect and secure setting of the recording sheet in correct position may be carried out easily by a simple operation, and the correct setting can be ascertained by the heads of pins 12 projecting from the through holes 19, 20 of the holding plates 15 and 16.

After the lowering down of the holding plates 15 and 16, the pressing plate 6 moves down to press the recording sheet M. On this occasion, there will be no risk that a part of the recording sheet is pinched between the pin 12 and the hole 14 of the pressing plate to cause damage to the recording sheet. Thus, even an unskilled operator can operate easily with no fear of causing damage and can obtain a very satisfactory result.

Fig. 6 illustrates a part of the above setting device with an additional device. In the drawing, the holding plate 16 is always urged to the opening position by a spring 21. When the recording sheet M is placed in position by engaging the holes 10 with the pins 12, the holding plate 16 is turned by hand to hold the sheet. The holding plate 16 has a notch 22 adapted to engage a lever 23 pivoted at 25 on the panel and is pulled by a spring 24. By the engagement of the notch 22 and the lever 23, the holding plate is fixed in closing position to secure the setting of the recording sheet on the panel more positively. For detaching the sheet, the lever 23 is turned in clockwise direction around the pivot 25 to release the notch 22, and the holding plate 16 is opened automatically by the action of the spring 21. Similar additional device may be provided for the holding plate 15, and, if desired, an interlocking device may be provided to open the holding plates on both sides simultaneously. Also a device may be provided to lower all the guiding pins 12 simultaneously below the level of the panel 11 in order to facilitate the removing operation for the recording sheet M.

In the magnetic recording and reading apparatus as shown in Fig. 1, it is difficult to see the position of the head in the course of recording and reproducing from the outside, and sometimes it is very inconvenient to judge the time expired for the recording or reproducing or required for completion, or when it is desired to reproduce only a certain part of the record in the interval position.

Figures 7, 8, 9, 11:
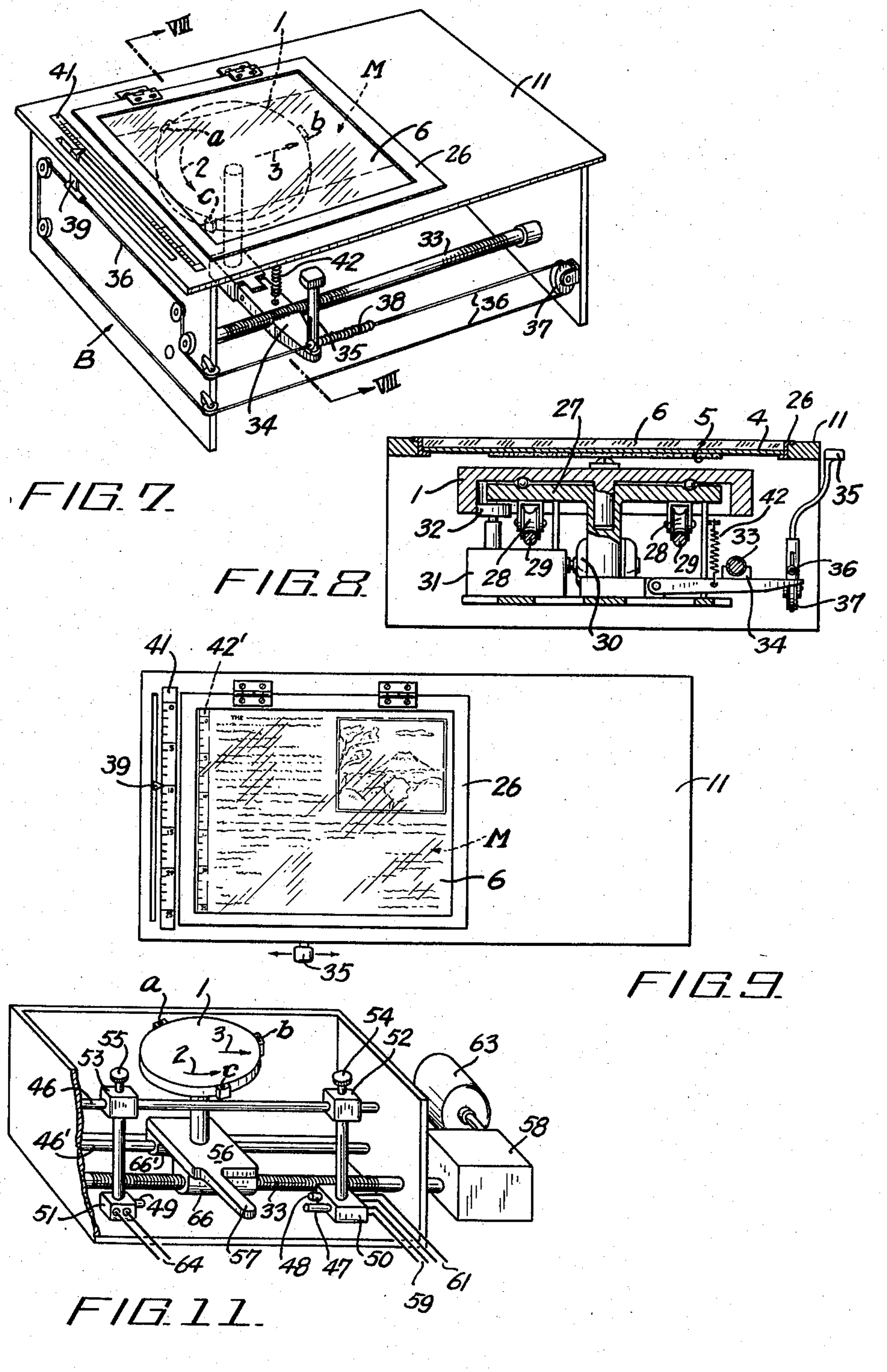
Fig. 7 is a perspective view of a magnetic recording and reading apparatus provided with an indicating device.
Fig. 8 is a sectional view taken on line VIII—VIII of Fig. 7.
Fig. 9 is a general plan view of the apparatus.
Fig. 11 is a perspective view showing one of the means for automatically shifting a rotating body.

In order to overcome such difficulties, according to this invention, an indicating device is provided which comprises an indicator adapted to move according to the linear motion of the rotary body 1 to show the linear position of the rotary body. In Figs. 7, 8 and 9, showing a circular disc type embodiment of this invention, a recording sheet M is fixed together with a pressing plate 6 on the panel 11 of a magnetic recording and reading apparatus B by means of a frame 26. A rotary body 1 having a plurality of heads *a*, *b*, *c* is arranged below the recording sheet M to rotate in the direction of the arrow 2 and to move in the linear direction of the arrows 3 along the guiding rods 29 by means of rollers 28 of a table 27 which supports said rotary body 1. The rotation of the rotary body is effected, for example, by a motor 30 through a reduction gear 31 and a transmission wheel 32, while the linear motion is effected through the motion of the supporting table 27 which moves together with a meshing member 34 adapted to mesh with a rotating threaded or screw shaft 33 to be moved thereby. The meshing member 34 can be operated by a press key 35 to come into or go out of the engagement with the rotating shaft 33. An endless member 36 in engagement with the engagement member 34 is guided by a grooved pulley 37 and is always in stretched condition due to a spring 38 or the like and has an indicating needle 39 fixed on a point of the member 36 to indicate on the panel 11 the position of the rotary body 1. For starting of the recording, the engagement between the meshing member 34 and the threaded shaft 33 is released by pressing the press key 35, and the rotary body 1 is moved to left in Fig. 7. On this occasion the transmission string 36 is also moved together with the indicating needle 39 since the string is in engagement with the meshing member 34. When the indicating needle 39 indicates the desired number of the scanning lines of the recording sheets, it shows that the head is in the position of the desired scanning line. For instance, if it is desired to start from the beginning of the scanning line, the rotary body is moved until the indicating needle 39 comes to the zero point of the scale on the panel 11 which shows that the head is at the starting point of the recording sheet. When the indicating needle indicates the zero position, the press key 35 is released to restore the engagement between the meshing member 34 and the threaded shaft 33. After the restoration of the engagement, if it is found that the indicating needle 39 shows some slight deviation the zero point, the position of the rotary body 1 may be adjusted by turning slightly the threaded shaft 33 in one direction or the other until the needle indicates the exact desired position. Then the recording or reproducing may be started by turning the rotary body 1 and at the same time moving said rotary body along the guiding rods 29 according to the rotation of the threaded shaft 33. On this occasion, the spring 36 and the indicating needle 39 is moved according to the linear motion of the rotary body 1, and thus the amount of sound already recorded or reproduced can be seen at any time at a glance.

In the reproduction of the sound, the start of reproduction from any desired point can be easily effected by preparing a mark on the non-magnetic surface corresponding to the content of the record or by providing a scale 42′ on said surface showing the number of the recording tracks corresponding to the content and setting the indicating needle to the number of the scale 41 indicated by the mark or the scale on the non-magnetic surface of the recording sheet M.

As stated above, in recording or reproducing, the amount of recording or reproducing already made and also to be made can be accurately known and further, in reproduction, the start of reproduction can be made from any desired point by shifting the rotary body, and thus the apparatus of this invention is made very convenient in use.

In the above, an endless member is used, but this arrangement can be easily modified to indicate the position of the rotary body directly from the rotation of the threaded shaft 33 or the shifting of the rotary body.

Figures 10, 12, 13, 14:
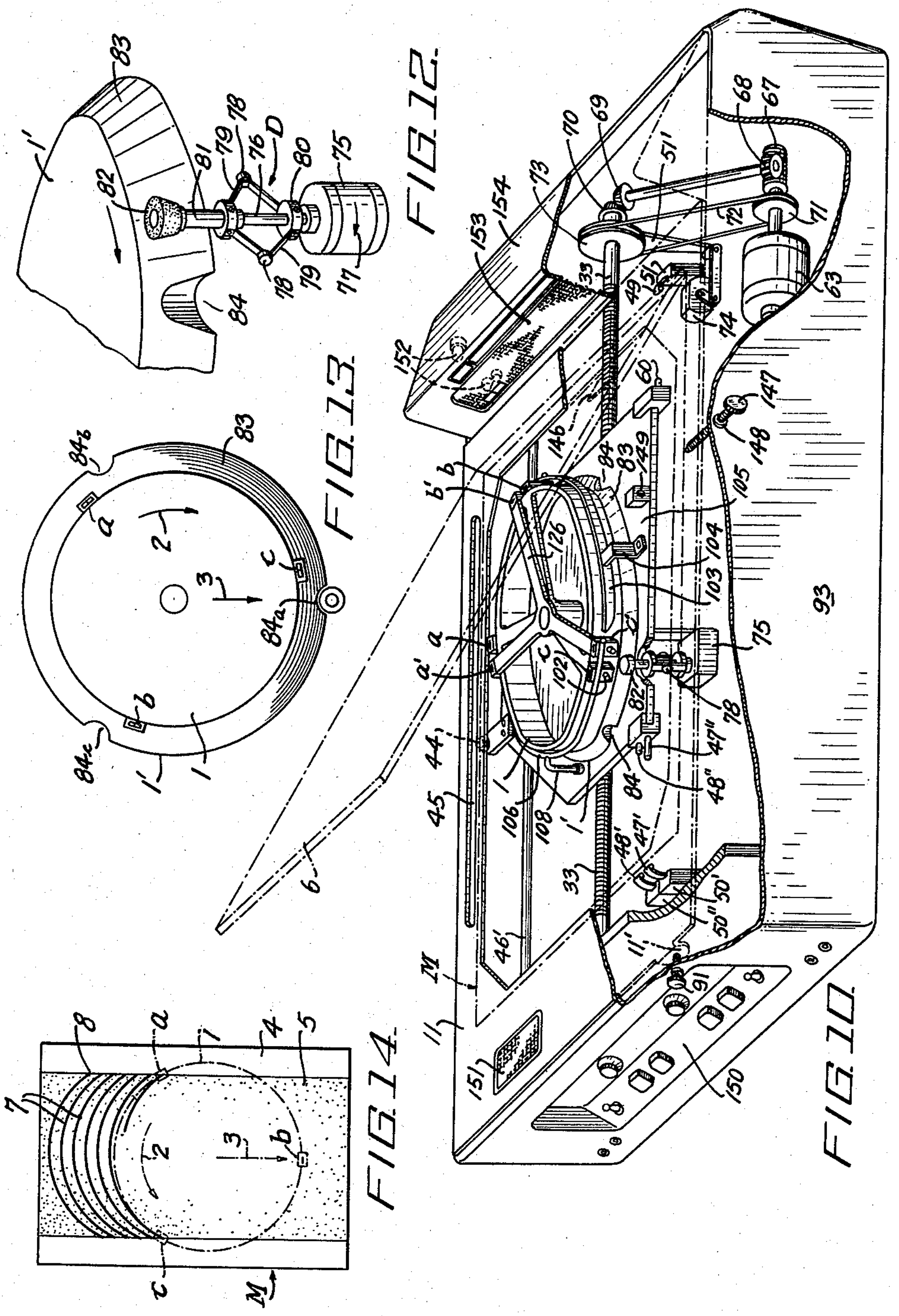
Fig. 10 is a perspective view of a complete assembly of one of the embodiments of the magnetic recording and reading apparatus of this invention, partly broken away in order to show the internal construction.
Fig. 12 is a perspective view showing one of the means for automatically setting the head in correct position.
Fig. 13 is a plan view of the apparatus of Fig. 12.
Fig. 14 is a bottom view seen from the back side of the recording sheet.

Fig. 10 illustrates a magnetic recording and reading apparatus provided with a small electric lamp 44 which moves to right or left according to the movement of the rotary body 1 and can be seen through a slot 45 to indicate the position thereof.

As stated before, at the start of recording if the rotary body 1 is not placed at the beginning point of the recording sheet, there will be various difficulties caused. On the other hand, when the recording comes to an end, it will be inconvenient if there are means for indicating the end.

Accordingly, an automatically operative device is provided as illustrated in Fig. 11 to overcome the difficulties as described above. In this embodiment, transition devices 50 and 51 having a switch over pieces 47, 48 and 49 are slidably mounted on a supporting rod 46 arranged in the direction of the shifting of the rotary body 1, and on the other side an abutment piece 57 is provided on a shiftable table 56 which supports the rotary body 1 and the group of heads *a*, *b*, *c* and shifts together with these supported members, and said abutment piece 57 is adapted to abut against the switch over pieces 47, 48 or 49 of the transition device 50 or 51 transition device when the rotary body 1 reaches the end of the cycle of recording, reproducing or demagnetizing, to operate the switch over pieces, to control automatically the operations such as the indication of the cycle, the stop of shifting motion, the start of the motion in reverse direction, etc., through the transition device 50, and also to control similar operations on the side of the starting point by the transition device 51. The construction and the operation of the apparatus as shown in Fig. 11 will be explained hereunder more fully.

In Fig. 11, a motor 63 drives a transmission mechanism 58 which drives a threaded shaft 33. A shiftable table 56 supports a rotary body 1 and may be shifted to the right and left by the rotation of the threaded shaft 33 by means of a member 66 fixed on said table 56 and in engagement with the rotating threaded shaft 33. A guiding rod 46′ is provided in the direction of shifting of the rotary body 1 and the shifting table 56 has a metal guide 66′ fixed thereon. A supporting rod 46 is provided in parallel to the direction of shifting of the rotary body and consequently to the threaded shaft 33. On this supporting rod are mounted devices 52, 53 for adjusting the positions of transition devices 50, 51 by set screws 54, 55. The transition device 50 has switch over pieces 47 and 48 while the transition device 51 has a switch over piece 49.

In recording (similar in reproduction and demagnetization), the rotary body 1 is moved from left to right as shown by the arrow 3. At the start, the rotary body 1 is placed at the utmost left end position and the projecting lever 57 of the shifting table 56 comes into contact with the switch over piece 49 to operate the rotation changing device 58 through the transition device 51 to start the recording while the rotary body 1 is rotated and shifted from left to right. When the lever 57 proceeds to the right according to the shifting of the rotary body and presses the switch over piece 47, the transition device 50 is operated to close a circuit 59 to light an electric lamp connected with said circuit to give a warning to the operator. When the lever 57 moves further to the right, it presses the second switch over piece 48 to close a circuit 61 to stop the motor 63. An arrangement may be made to open the circuit 61 again after closing, and to operate the motor in reverse direction, or to rotate the threaded shaft 33 rapidly in reverse direction after the stop by modifying the rotation changing device 58, and thus the table 56 may be returned rapidly and automatically from right to left to the starting point. When the table 56 returns to the starting point, the lever 57 comes into contact with the switch over piece 49 and the motor 63 is stopped or operated to rotate the threaded shaft 33 in normal direction again at a proper speed under the control of the rotation changing device 58 for recording, reproducing or demagnetizing, and thus the rotating body 1 may be returned automatically to the leftmost position ready for the start of recording, reproducing or demagnetizing operation. The transition devices 50, 51 are slidably mounted on the supporting rod 46 and their positions may be fixed by the adjustment devices 52, 53 and associated screws 54, 55 at any desired positions as explained before. Therefore the shiftable table 56 can be set to have any desired range of shifting. This is very convenient when only a certain portion of the record is desired to be reproduced repeatedly.

As explained above, the indication, the stop and the reversed operation are all effected automatically and there is no chance of causing damage to the head, the recording sheet as well as to any other part of the apparatus, and hence this apparatus can be safely operated.

Returning to the apparatus of Fig. 10, the safe automatic operation will be explained. The shiftable table 105 supporting the rotating body 1 is movable to right and left by the rotation of the threaded shaft 33. When the table 105 in engagement with the threaded shaft 33 by a guiding threaded piece (not shown) is at the right end starting point, a pressing piece 60 fixed on the shiftable table 105 is in engagement with a switch over piece 49 of the transition device 51 and acts to stop the motion of the shiftable table 105 to right. When the table 105 moves to left, a pressing piece 47″ fixed on the table 105 firstly comes into contact with a switch over piece 47′ of a transition device 50′ and acts, for example, to give a warning of the approach to the end of recording and when the shiftable table 105 moves further to right, another pressing piece 48″ on the table comes into contact with a switch over piece 48′ of another transition device 50″ to cut off electrically the power source driving the shiftable table 105 to shift and thus the shifting is stopped.

The mechanism for rotating the threaded shaft 33 in Fig. 10 is as follows:

The motor 63 rotates a pair of bevel gears 69, 70 and threaded shaft 33 is connected with the bevel gear 70 and is rotated thereby.

The quick forward driving or return driving of the shiftable table 105 is effected by a mechanism such as follows:

A pulley 71 is rigid with the shaft of the motor 63 and is connected with a pulley 73 through a belt 72 to rotate it. The pulley 73 is not fixed normally on the shaft 33 and can rotate freely around the shaft, but it is so arranged that the pulley 73 and the shaft of the threaded shaft 33 are connected to become a unit by a dovetail groove engagement through a clutch lever 51′ when an electromagnet 74 is energized and at the same time the bevel gear 70 goes out of engagement with the bevel gear 69. With such an arrangement, the threaded shaft 33 rotates at a high speed when the electromagnet 74 is operated. Accordingly the direction of rotation of the threaded shaft 33 can be controlled to be normal or reverse by the control of the direction of rotation of the motor 63 and quick forward movement or return movement of the shifting table 105 may be effected.

The means of returning the rotary body to the starting point in relation to the recording sheet in recording or reproducing in the magnetic recording and reading apparatus has already been described. Next will be explained the means for automatically returning the head for recording or reproducing to the starting point.

In the magnetic recording and reading apparatus, a plurality of heads are fixed on a rotary body or an endless belt at equal distances, and said rotary body or belt is rotated while being shifted in a linear direction. Said rotary body or belt can be stopped at any desired position and consequently the heads may be stopped at any point. When the head is not at a starting point even if it is in the first track and the reproduction is started, the beginning portion of the record will be missed. It is therefore necessary to eliminate this disadvantage. In Figs. 12–14, a motor 75 rotates a shaft in the direction of the arrow 77. A governor D is composed of weights 78 and leaf springs 79, and one end thereof is fixed on the shaft 76 by a fixing metal 80 while the other end of the governor is fixed on one end of a slidable sleeve 81 which is slidably mounted on the shaft 76 and has a fixed roller 82 on its top end. The rotary body 1 is not shown in Fig. 12 but it is to be understood that it is mounted on a supporting table 1′ and rigid with the table 1′ to be rotated in the direction of the arrow 2 and at the same time is shifted linearly in the direction of the arrow 3 together with the supporting table 1′. As a result, the tracks on the recording film are formed in the shape of circular arcs as shown in Fig. 14.

The supporting table 1′ has a side face 83 inclined as shown in the drawings and grooves 84 are provided on said side. The radius of curvature of the groove is larger than that of the roller 82. When the motor 75 is stopped, the position of the roller 83 is relatively high and it is not in contact with the side surface of the supporting table 1′ because of the inclination of the side surface. When the recording or reproducing is completed and the rotation of the rotary body is stopped, it is necessary to return the head to the starting point, namely point 8 in Fig. 14. For this purpose, a switch for the motor 75 is closed to rotate the motor to start the rotation of the governor D. The weights 78 are thrown outwardly by centrifugal force to lower the roller 82 and to bring it into engagement with the side surface 83 of the rotary table 1′ to turn it. When the groove 84 comes to the roller 82, the roller falls in the groove which has a greater radius than that of the roller, and the roller will now turn idly without driving the rotary table 1′ and consequently the rotation of the rotary body 1 is stopped. It will be evident that the head is brought to the starting point by determining properly the position of the groove 84 and the position of the governor D. Now the rotation of the motor 75 is stopped and the roller 82 will be raised by the action of leaf springs 79 to lose contact with the rotary table 1′ so that it may not hinder any way the rotation of the rotary body 1 and the rotary table 1′.

Fig. 13 illustrates a circular rotary body 1 provided with three heads *a*, *b* and *c*. As shown in the drawing, the distances between each head and the adjoining groove, namely the distance between (*a*–84*a*), (*b*–84*b*) and (*c*–84*c*), are equal. With this arrangement, the position of one head will be brought back always quickly to a starting point by turning the rotary table 1′ by an angle less than 120°. While the descriptions have been made in the above with regard to a circular rotary body 1 having a plurality of heads at equal intervals, it is apparent that a similar arrangement may be applied to a magnetic recording and reading apparatus having an endless belt provided with a plurality of heads at equal intervals to scan a magnetic recording sheet.

The application of the device as shown in Figs. 12–14 in a magnetic recording and reading apparatus can be seen in Fig. 10.

In the above is described how to set the head at the starting point 8 as shown in Fig. 14 by turning the rotary table 1′ by means of the motor 75, the governor D, the groove 84, etc. In this connection, it is of course necessary that the rotary body 1 be in a position so as to be capable of being freely rotated at the time of this setting. With regard to the device for this purpose, detailed explanation will be made later with reference to Figs. 18–20 and 25.

The magnetic recording and reading apparatus of this invention has further a mechanism as follows:

In setting a magnetic recording sheet on the reading apparatus, there may be difficulties in setting a correct position due to elongation or shrinkage of the sheet by the variation of temperature and humidity. When it is intended to reproduce and to hear a sheet at given temperature and humidity which are different from those at the time of recording, it is necessary to adjust the relative position between the track and the head so that they register substantially accurately since the width of the sound record track and the head is in the order of about 1 mm. and if this condition is not satisfied, the decrease of output, a degradation of the quality of sound, the admixture of noise and the like will be caused.

According to this invention, the deviation between the record track and the head may be minutely adjusted to bring about accurate scanning of the reproducing head on the record track.

Figures 15, 16, 17, 18, 19, 20:
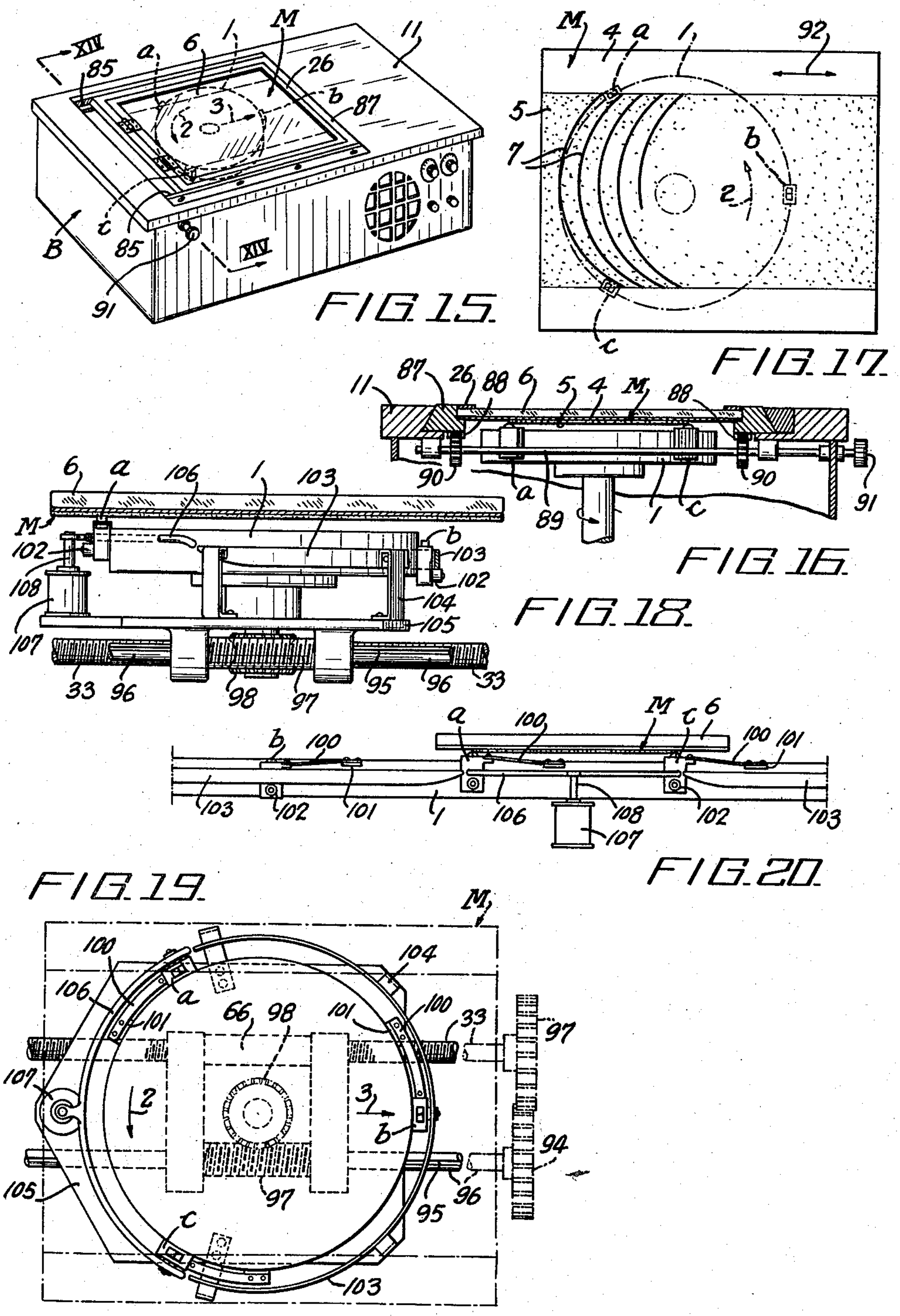
Fig. 15 is a perspective view showing one example of means for the adjustment of the relation between the record track and the head.
Fig. 16 is a front view showing one part of Fig. 15 in longitudinal section.
Fig. 17 is a bottom view seen from the back side of the recording sheet.
Fig. 18 is a partial front view of one example of means for separating the head from the recording sheet.
Fig. 19 is a plan of the structure of Fig. 18.
Fig. 20 is an enlarged view of the side of the rotary body.

In the embodiment illustrated in Figs. 15–17, on the panel 11 of the recording and reading apparatus B guiding grooves 85 and 86 are provided, and a sliding frame 87 carrying a frame 26 in which a recording sheet M and a pressing plate 6 are held in overlapping relation is mounted in said grooves 85 and 86. On the bottom lower surface at the slidable frame 87 is fixed a rack 88 in meshing relation with a pinion 90 fixed on a shaft 89 supported by the fixed part of the recording and reading apparatus. The shaft 89 has a knob 91 at one end. The reading apparatus B has a circular disc 1 provided with three reproducing heads *a*, *b*, *c* in the interior, and said disc 1 is arranged to rotate in the direction as shown by the arrow 2 and at the same time to shift in the linear direction as shown by the arrow 3 by a rotating threaded shaft (not shown).

As described above, the record sheet M is placed to put the magnetic coat film 5 downside confronting the head *a* and is pressed from the top side by the pressing plate 6 to be fixed in expanded condition in the frame 26. Then the rotary body 1 is rotated and shifted in directions of 2 and 3 by the operation of the threaded shaft. On this occasion, if the position of the head *a* is not in the correct coincidence with the record track 7 of the sound record sheet M as shown in Fig. 17, the reproduction can not be effected satisfactorily. In order to overcome this difficulty, the knob 91 is operated to slide the slidable frame 87 through the shaft 89, the pinion 90 and the rack 88 along the grooves 85 and 86 of the panel 11. By this means, the record sheet M may be shifted in the direction of 92 of Fig. 17 to bring about exact coincidence between the scanning locus of the head and the record track 7. While the adjustment in the direction of 92 in Fig. 17 is described in the above, it is of course also possible to make an adjustment of the position of the recording sheet in the direction perpendicular to the direction of 92 by a similar mechanism. The adjustment may also be attained by moving the rotary body carrying reproducing heads while keeping the sheet in a fixed position.

By the mechanism as described above, the position of the record sheet or the head can be adjusted minutely, and therefore a good result can be attained in reproduction by securing a good quality and volume of the sound through an accurate coincidence of the record track and the head despite the elongation and shrinkage of the sheet.

The application of the mechanism as described above is seen in Fig. 10.

On the panel 11 is fixed a metallic member 11' as a unit body. (The panel has a dovetail groove as shown in Fig. 16, and is slidably mounted on the casing 93, but it is not shown in Fig. 10.) The panel 11 can be moved slightly to the right or left by turning a knob 91 mounted on the casing 93.

In Fig. 2, the rotary body 1 having three heads *a*, *b*, *c* fixed in the positions as shown in the drawing is rotated in the direction of the arrow 2 and at the same time is shifted in the direction of the arrow 3. When the head *a* is recording the record track arc *a–c*, the heads *b* and *c* must not record tracks between *b–a* and *c–b* and they have to be maintained idle. However, parts of the arcs *b–a* and *c–b* are facing to the magnetic recording film 5 and therefore unnecessary and harmful recording may be exercised in these parts if the heads *b* and *c* are not separated from the magnetic recording film 5.

Accordingly, in the magnetic recording and reading apparatus of this invention, a mechanism is provided to separate the heads during idle periods from the magnetic coating film 5 of the sheet in recording or reproducing according to necessity.

An example of this mechanism is illustrated in Figs. 18–20. A rotating shaft 96 is rotated by a gear 94 driven by a motor (not shown). This shaft 96 has a key 95 and rotates a worm 97 connected with the shaft through said key 96 and drives a worm 98 in meshing with the worm 97 to rotate a rotary body 1. The gear 94 is in engagement with a gear 99 which rotates a threaded shaft 33 and acts to shift the rotary body 1 in a linear direction through a guiding screw in engagement with the threaded shaft 33. The heads are connected electrically in series or parallel to have current of same wave form for recording.

When recording is started with this apparatus, the head *a* will execute the necessary recording of an arc form on the coating film 5, and at the same time another head confronting with the film (head *b* in Fig. 19) will also carry out unnecessary and harmful recording since all the three heads have same electric current for recording. It is therefore necessary to prevent the unnecessary recording of the heads during the rest period while exercising the necessary recording by only one head during the action period. In the embodiment of Figs. 18–20, this is arranged by an additional mechanism to separate the heads from the coating film 5 while maintaining one head during the action period in contact with the coating film to obtain the necessary recording. In the drawings, heads *a*, *b* and *c* are attached to a rotary body 1 by means of a fixing metallic member on the body 1 through a leaf spring 100. Along the circumference of the rotary body 1 is provided an arc guide 103 both ends of which are inclined to form sloped portions as shown in the drawings. This guide 103 is fixed on a shiftable table 105 by means of supporting members 104. When the head *a* is turned in the direction of the arrow 2 and enters into the range where the necessary record track is to be formed, the head *a* can approach the magnetic recording film 5 to form the record track since the projection 102 of the head *a* is not in contact with the guide 103 and the head *a* is urged by the leaf spring 100 toward the magnetic recording film 5. On this occasion, the projection 102 of the head *c* comes in contact with the lower edge of the guide 103 and is urged downward by the guide as the rotation of the rotary body 1 proceeds and thus the head *c* will be separated from the surface of the coating film 5. The head *b* is still maintained in the down position by the guide until it comes into the turn of its action when the head *a* is spaced from the film 5. In this way, the record track is formed successively by one head, separating other heads from film 5 thereby preventing completely the formation of harmful tracks on the recording film.

Even with the apparatus as described above, however, there will be still a difficulty in such a case as returning the head to the starting point by reversed rotation of the threaded shaft 33 by operating the motor in reverse after the completion of recording or reproducing. As stated above, with the guide 103 of Figs. 18–20, one of the three heads is always maintained in contact with the recording film 5, and therefore, when the rotary body is returned to the starting point in this condition, the contacting head may scratch the surface of the recording film thereby causing damage to the delicate tracks of fine width. It is therefore necessary to maintain all the heads separate from the recording film surface during the time of the return motion of the rotary body 1. For this purpose, a pressing lever is provided in the interval when the guide 103 does not act and it is arranged to operate this lever manually or electrically to separate the head in contact from the coating film 5 in return motion of the rotary body 1. For example, in Figs. 18–20, a circular pressing lever 106 is fixed on one end of a movable member of an electromagnet 107 and it is arranged to pull down by a movable member 108 of an electromagnet 107 when said magnet is energized thereby to separate the head *a* from the coating film 5 by engagement of the projection 102 of the head and the lever 106. By proper arrangement of the guide 103 and the lever 106, all the heads *a*, *b* and *c* may be separated from the coating film 5 during the quick return motion of the rotary body irrespective of the positions occupied by these heads, and an ideal operation of the apparatus may be achieved. While the descriptions have been made in respect of recording heads and reproducing heads, it is evident that similar mechanisms are applicable to demagnetizing heads as well.

Fig. 10 shows an application of the mechanism as illustrated in Figs. 18–20. Corresponding parts are indicated in these drawings with same reference numerals and letters, *a'*, *b'* and *c'* in Fig. 10 being demagnetizing heads respectively.

The efficiency of the apparatus of this invention in practical use can be promoted greatly by providing a mechanism by which both recording and reproducing can be effected by turning the rotary body 1 in both normal and reverse directions.

Figure 21:
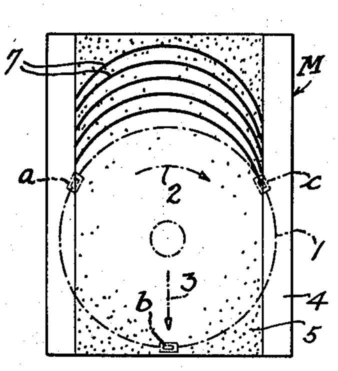
Figs. 21, 22 and 23 are rear views of a recording sheet for the explanation of how the recording and reproducing may be effected in both normal and reverse directions.
Figure 22:
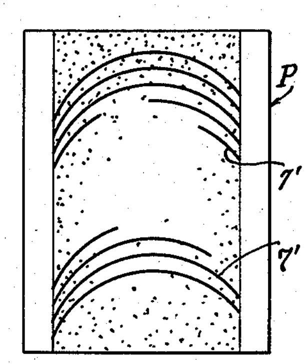
Figure 24:
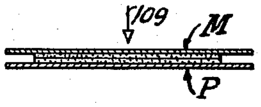
Fig. 24 is a front view showing one of the means for manufacturing reproductions of a recorded sheet.

Now one of the embodiments of the method for producing a great number of reproduction from a master sheet which has been produced by recording magnetic sound tracks 7 on the magnetic sound recording film of a magnetic recording sheet as shown in Fig. 21 by a magnetic recording and reading apparatus of this invention. In Fig. 24, M is a recorded master sheet and P is a print sheet to be recorded. The two sheets are piled one on the other, contacting the magnetic coating film with each other, and an alternating magnetic field (the strength of the magnetic field is controlled not to be so strong as to cause the demagnetization of the sound record of M) is applied thereto and the magnetic field is gradually attenuated to become zero, and then the two sheets are separated. By this operation, the sheet P will be printed the sound record from the master sheet M while maintaining the sound record of the master sheet M substantially unaffected. By repeating this operation, a great number of printed sheets may be produced from one master sheet. The reproduced printed sheet P obtained by this operation will be as shown in Fig. 22, and the sound track 7′ printed will be opposite to the track 7 of the master sheet M as shown in Fig. 21 in the manner as the image in a mirror, and therefore the motion of a reproducing head in the same direction as in the recording time will not scan the track correctly and fail in reproduction. If it is desired to obtain a reproduced sheet having sound tracks of the same direction as the master sheet M, this can be produced by reproducing from the printed sheet P using it as the master sheet according to the operation as described before. However, since the strength of the magnetic sound record is generally lowered by about 18 decibels per print, if it is repeated twice, the final reproduction will have a sound record of such a low strength as to make it difficult to obtain sound of the same volume as that of the master sheet even if adjustment is made with regard to an instrument such as a sound volume adjuster of an ordinary magnetic recording and reading apparatus. Moreover, it may cause hums and noises and degradation of the quality of the sound thereby making it utterly useless in the worst case.

In order to avoid such difficulties, it is preferable to rotate the rotary body 1 in the opposite direction so that the head may scan correctly the tracks of the first print as shown in Fig. 22 to reproduce the original sound perfectly. The strength of the magnetic record P is lower by about 18 decibels than that of the master sheet as the result of one printing operation, but such a decrease of the strength can be easily recovered by a little adjustment of the sound volume adjuster of the magnetic recording and reading apparatus and will not cause any difficulty in practical use.

If the master sheet M is recorded in the reversed direction opposite to the direction of the arrow 2 by employing a magnetic recording and reading apparatus of this invention which is operable in both normal and reverse directions, and the printed sheet P is reproduced from the said master piece M, the reproduced sheet will have normal tracks as shown in Fig. 21 and this sheet can be reproduced satisfactorily by employing a reading machine which is operable only in the normal direction.

In view of the fact that the printing of a master sheet is very often required nowadays, it is important in reproducing sound to provide a magnetic recording and reading apparatus which can exercise the scanning in both normal and reverse directions as described before.

Figure 23:
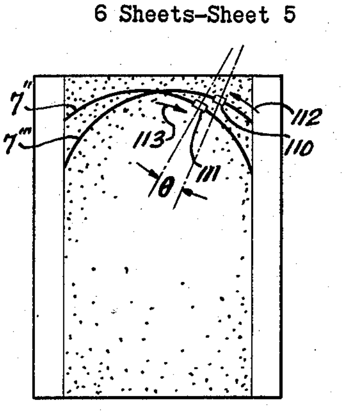

It may be also possible to provide a sound recording sheet as shown in Fig. 23, in which two series of tracks 7″ and 7‴ are provided on a single same sheet. In the drawing, the track 7″ is scanned by a head 110 in the direction of the arrow 112 while the track 7‴ is scanned by a head 111 in the direction of the arrow 113. Since the gaps of the heads 110 and 111 are respectively perpendicular to the tracks 7″ and 7‴, an angle of $\theta$ is subtended between the direction of the directions of these two gaps. Despite the fact that the tracks 7″ and 7‴ intersect with each other, due to the angle as mentioned above and the extremely small width of the gap of a reproducing head (for example, generally in the order of about 7/1000 mm.), both of the sound records will not be seriously affected and both of them may be able to reproduce the original sounds independently. When the recording is effected on one sheet in both normal and reverse directions as described above, a recording time twice as long as the time of a sheet recorded only in one direction normal or reverse may be obtained.

While the above descriptions have been made with regard to a scanning system of a rotary body type, it may be applied to a scanning system of a linear direction. It will be convenient to provide an indicating device such as an electric lamp or some mechanisms to show the direction of operation whether it is normal or reverse. The reverse rotation may be effected by reversing the rotation of the associated motor or, in the case it is turned by a rim driving mechanism, by providing an additional idler in the mechanism which effects reversed operation.

Figure 25:
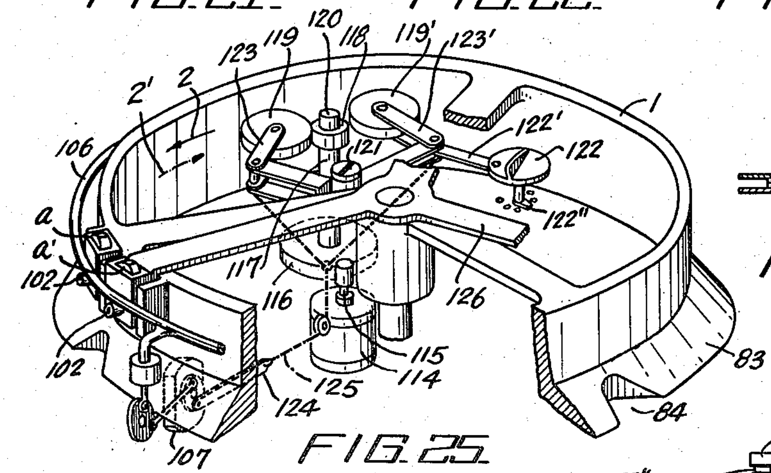
Fig. 25 is a perspective view showing important elements of a magnetic recording and reading apparatus which may be operated in normal and reverse directions.

In Fig. 25, a synchronous motor 114 rotates a shaft 115 and rotates driving wheels 118 and 120 through a rubber wheel 116 and a shaft 117. The wheel 118 is in contact with a rubber wheel 119 freely rotatably mounted and rotates said wheel. The motive power of the wheel 119 is transmitted to a rotary body 1 to rotate it in the direction of the arrow 2 and to effect scanning for recording or reproducing by a head $a$ fixed on said rotary body 1.

In order to lower the recording speed, the shaft 117 is so arranged as to be moved downwardly to bring the driving wheel 20 of a smaller diameter in contact with the wheel 119 in place of the wheel 118 of a greater diameter. For this operation, a screw 121 is turned to push down the shaft 117.

In the apparatus of this invention, it is sometimes necessary to reverse the direction of rotation of the rotary body 1 from the direction of 2 to the direction of 2′ (hereafter the rotation in the direction of 2 is referred as normal rotation and that in the direction of 2′ as reverse rotation), and the motor 114 is rotated reversely for this purpose. In carrying out the change of the rotation of the rotary body 1, it is not sufficient only with the reversed operation of the motor 114, and therefore there is provided a mechanism comprising a knob 122 and associated metallic links 122′, 123′ and 123, and it is arranged to transmit the motion for changing direction to the wheel 119 or 119′ so that one of the two wheels is detached from the engagement with the driving wheel and the other is brought into the contact. A switch for controlling the direction of rotation whether normal or reverse is interlocked with the motion of the knob 122, and the direction of the motor 114 is decided to be normal or reverse according to whether the knob 122 is in the normal position or the reverse position.

The reason for carrying out the conversion of free rotary wheels 119 and 119′ from one to the other simultaneously with the change of the direction of the rotation of the motor 114 is that it is necessary to apply always force from the wheel 118 to the rotary body 1 in the direction to push it forward, in other words the free rotary wheel 119 or 119′ comes into between the wheel 118 and the rotary body 1.

As stated before, when it is desired to adjust the position of the head to the starting point by rotating the rotary body, the electromagnet 107 is operated to separate the head in contact with the magnetic film as explained with reference to Figs. 18–20. In the embodiment of Fig. 25, it is so arranged that levers 123 and 123′ supporting wheels 119 and 119′ for driving the rotary body 1 are pulled by a metallic member 124 associated with the electromagnet 107, a chain 125 and the like. When levers 123 and 123′ are pulled, the wheels 119 and 119′ are separated from the driving wheels 118 and 120 and hence the rotary body 1 will become freely rotatable in either direction for the adjustment of the position of the head.

In recording, it is desirable to demagnetize the magnetic film immediately before recording. For this purpose, in Fig. 26, demagnetizing heads or erasing heads $a'$, $b'$ and $c'$ are provided in positions immediately preceding the recording heads $a$, $b$ and $c$ respectively in the rotation in the direction of the arrow 2. By this arrangement, following the erasure by the head $a'$, recording may be satisfactorily carried out by the head $a$ and it will be same with $b'$ and $b$ as well as $c'$ and $c$. However, if the recording is carried out in the direction of the arrow 2', the recording performed by the recording head $a$ will be erased immediately by the demagnetizing head $a'$ and no recording can be obtained. On the other hand, if it is arranged not to operate the demagnetizing head $a'$ at all, there will be inconvenience in that the previous unnecessary record can not be erased before recording by the recording head $a$.

Figures 26, 27:
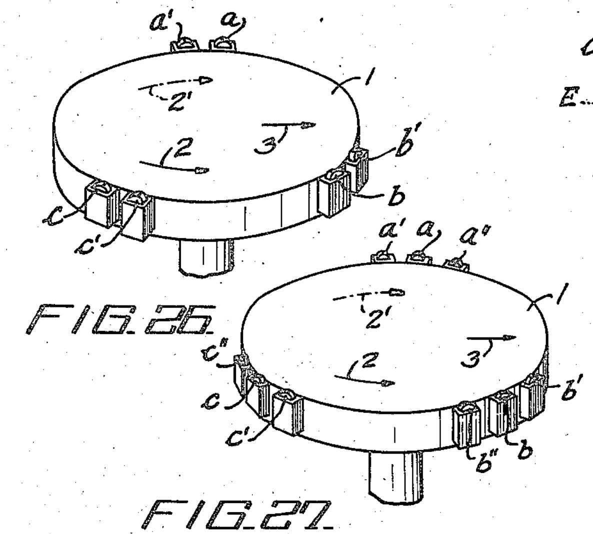
Fig. 26 and 27 are perspective views and Fig. 28 is a plan view showing a rotary body provided with erasing heads together with recording heads.

Accordingly in Fig. 27, a pair of demagnetizing heads are provided for each recording head in such a way as one precedes the recording head while the other follows, and it is arranged that the preceding demagnetizing heads $a'$, $b'$, $c'$ of all pairs are put on while the following heads $a''$, $b''$, $c''$ are put off in recording of normal direction and vice versa in recording of reverse direction. By this means, recording can be effected in both normal and reverse directions. However, this arrangement has some disadvantages in that it requires nine heads and increases the cost of production, and also in that, since it has so many heads, it increases the friction and tends to cause irregular rotation thereby causing degradation of the quality of sound recorded, and further in that since it is necessary to carry out switching of circuits of demagnetizing heads in two groups in recording of normal and reverse directions, it makes the electric circuits complicated. Accordingly, it is designed by this invention to use the same demagnetizing heads in both normal and reverse recordings and still to enable effecting the recording in both directions satisfactorily.

Figure 28:
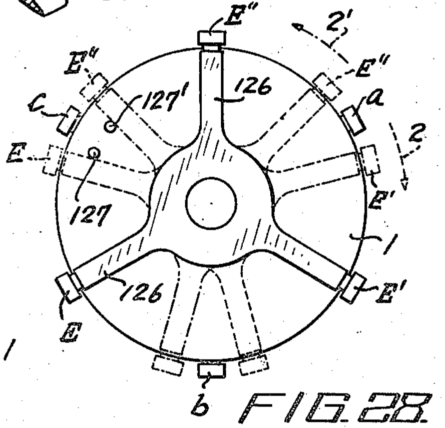

Fig. 28 illustrates one of such designs of this invention. In the drawing, a member 126 having three arms supports three demagnetizing heads E, E' and E''. The supporting member 126 is concentric with the rotary body 1 and is rotatable independently of the rotary body 1. The three demagnetizing heads are arranged thereon at equal intervals of 120° from one another. The rotary body has a pin 127 in front of the head $a$ and a pin 127' in back of said head. When the rotary body 1 is rotated in normal direction or the direction of the arrow 2, the pin 127 comes in contact with the arm of the support 126 and rotates the support in the same direction. This runs the demagnetizing head E in front of the head $a$. On this occasion, it is apparent that the demagnetizing heads E' and E'' run in front of the heads $b$ and $c$ respectively and thus proper erasure can be effected in normal recording. On the other hand, when the rotary body 1 is rotated in reverse direction, the support 126 is maintained at a standstill until the pin 127' comes in contact with the arm bearing the demagnetizing head E''. On this occasion, the demagnetizing head E'' will be in a preceding position in the direction of the reverse rotation in relation to the recording head $a$ and the demagnetizing head E' in a preceding position in relation to the recording head $c$ and the demagnetizing head E in a preceding position in relation to the recording head $b$. Since then, the support 126 may be rotated together with the rotary body to effect demagnetizing before the recording of each recording head, maintaining the relative position between the demagnetizing head and the recording head as mentioned above. Thus the demagnetizing may be effected satisfactorily also in recording in reverse rotation.

In Fig. 10, the application of the device of Fig. 28 to the apparatus of this invention can be seen. In said figure, $a$, $b$ and $c$ are recording heads, $a'$, $b'$ and $c'$ are demagnetizing heads respectively, while the support is represented by 126.

In the apparatus for magnetic recording and reading of this invention, a further special device is contemplated relating to the means of supporting heads. As stated before, the record sheet has a relatively large width and area and a magnetic coating film is formed thereon. With such a sheet, it is practically difficult to stretch the whole area uniformly and to maintain it flat. The carrier of the sheet is ideal when it is elastic in other words when it has a structure of loose and dense. As a result, it is unavoidable to have a coating film having unevenness to some extent.

Figure 29:
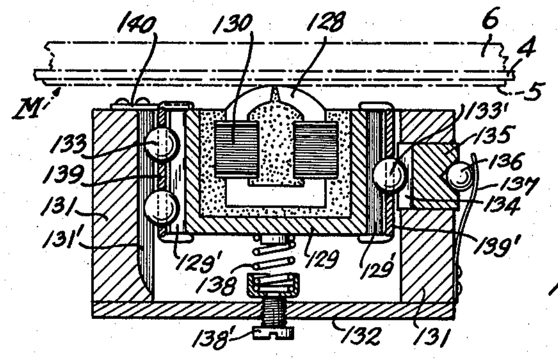
Fig. 29 is a longitudinal front sectional view of a device for supporting heads on the rotary body.
Figure 30:
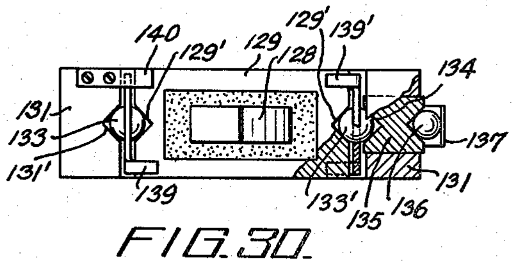
Fig. 30 is the plan view of the device of Fig. 29.

According to this invention, the head is supported to be movable only in the direction of up and down elastically but not in lateral direction by fixing the head in a head box which is supported by fixed posts through balls or rollers, slidably only in the direction of up and down. The mechanism of this device will be described in detail hereunder with reference to the specific embodiment illustrated in Figs. 29 and 30.

A recording head 128 is fixed in a head box 129. The head 128 is provided with coils 130. On the base 132 are fixed supporting posts 131, 131 and on the inside surface of one of the posts and also in the side walls of the head box 129 are provided grooves 131', 129' of V-shape or the like as shown in the drawings. The other of said posts has a pressing block 135 slidably fitted therein, which has a groove 134 on the inside surface. Balls 133, 133' are mounted in these grooves. The ball 133' is pressed by the pressing block 135, which is pressed against the ball 133' by a spring 137 through another ball 136. The head box 129 has an adjustable spring 138 under its bottom and is always urged upwardly by the spring 138. The pressure of the spring 138 is adjustable by a screw 138'. The balls 133 and 133' are supported by plates 139, 139' in the aforementioned grooves 131', 129'. The projection of the head box 129 beyond the top of the post 131 is prevented by a stop plate 140 fixed on the top of the post 131.

With the construction as described above the motion of the head 128 and the head box 129 in the direction of up and down is free and can be made smoothly by the action of balls 133, 133', but the lateral motion is prevented by V-shaped grooves and the pressure of the spring 137.

When recording or producing is exercised with the head as described above, satisfactory recording or reproducing can be achieved since the head 128 can always maintain intimate contact under the action of the spring 138 with the sheet kept under the pressing plate even if there may exist a certain amount of unevenness thereby avoiding any harmful effect of degrading the quality of the sound.

Magnetic recording and reading apparatus of this invention, is generally so constructed as to effect recording, reproducing and demagnetizing with the same equipment, and there will be instances when a very important record is made. In such a case, if the record is erased by mishandling said record when it is attempted to hear the record or the like, it is a serious loss of grave consequence which is not recoverable. There will also be a danger of recording over the important record in overlapping through carelessness.

Accordingly, this invention provides also a means by which the erasure of the important record by a demagnetizing head or a duplicating recording over the important record can be absolutely prevented even if by mismanupulation a wrong circuit is operated. Figs. 31, 32 and 33 illustrate one of the embodiments of such means. As shown in Fig. 31, the record sheet M has a prevention means F in the part of the sheet outside of the part of record tracks. The prevention as above mentioned is effected by simply plugging a hole 141 of the record sheet M or providing an electric connection means or an insulation means as described hereunder. As shown in Fig. 33, the recording and reading apparatus is provided with a contact 143, and one end of a pressing button 145 supported by a leaf spring 144 abuts against the contact 143 while the other end of the button 145 projects through a hole above the panel 11 for attaching the record sheet M which is pressed by a pressing sheet 6 thereon. When the record sheet M is placed on the panel 11, the button 145 passing through the hole 141 of the sheet M, the contact is maintained in closed condition. If the circuit of the contact 145 is connected to the recording circuit and the demagnetizing circuit, these two operations will not be prevented. When the record sheet M is important and is to be secured from demagnetization and overlapping recording, the hole 141 of the record sheet M will be closed by pasting a piece of paper 142 or by some other means as shown in Fig. 32. The plugging material 142 such as paper may be colored red and have warning words such as "Erasure Prohibited" or "Preserved Record" in order to draw attention of the handling persons. Despite these warnings, imagine the event when the record is placed on the panel 11 for recording or demagnetizing by some mistake. Recording or demagnetizing still can never occur since the paper 142 presses the button 145 down and opens the contact 143 as shown in Fig. 34 and the circuits for recording and demagnetizing can never be operated. On the other hand, the reproduction of sound will not be affected in any way since the contact 143 has nothing to do with the reproducing circuit. In this way, the important record sheet M can be safeguarded perfectly from erasure and overlapping record. While only one of the embodiments is described in the above, the object may be attained in various modified ways, for example, by cutting one corner of the sheet, by forming a recess, by pasting a nonconductive material on a certain spot of the sheet, or by electrically preventing demagnetizing or overlapping recording through an electric circuit which is arranged to prevent automatically demagnetizing or overlapping recording under action of a photoelectric tube operated by filtered light or reflected light.

In the apparatus of Fig. 10, the spot in the pressing plate 6 corresponding to the hole 141 of Fig. 31 is indicated by 147. The drawing showing the general assembly of the apparatus for magnetic recording and reading of this invention of Fig. 10 has also various additional devices or members, among which, 147 is a screw which passes through a threaded hole 148 of the casing 93 and has a tip adapted to enter the hole of a metallic element 149 fixed on the shiftable table 105. By the operation of this device, the shiftable table may be moved without causing any damage to the threaded shaft 33. 150 is a control panel on which members such as a knob for the control of a switch of a circuit for amplifying sound recording current and the like are mounted, 151 is a microphone accommodated inside of the casing 93, 152 is a pilot lamp for indicating the conditions of various electric circuits of the apparatus, and 153 is a window for discharging the sound of a loudspeaker (not shown) accommodated in the housing 154.

It is to be understood that this invention is not limited to the embodiments shown in the accompanying drawings and the accompanying descriptions which are set forth for the purpose of illustration, since it will be apparent to those experienced in the art that this invention may be varied and modified in many ways without departing from the scope and the spirit of this invention.

What is claimed is:

1. Apparatus for reading a planar magnetic record of constant width comprising means adapted for supporting the record in a fixed plane, a rotary device defining an axis of rotation normal to said plane, a plurality of magnetic heads on the rotary device for rotation therewith adjacent the record, the heads being equally spaced at a distance corresponding to the width of the record so that one head commences to scan the record as another head finishes scanning the record, and means for moving the rotary device transversely to the width of the record to enable the scanning of sequential portions of the record, the means adapted for supporting the record comprising pins insertable through the record and a hinged plate adjacent the pins for maintaining the record thereupon.

2. Apparatus for reading a planar magnetic record of constant width comprising means adapted for supporting the record in a fixed plane, a rotary device defining an axis of rotation normal to said plane, a plurality of magnetic heads on the rotary device for rotation therewith adjacent the record, the heads being equally spaced at a distance corresponding to the width of the record so that one head commences to scan the record as another head finishes scanning the record, and means for moving the rotary device transversely to the width of the record to enable the scanning of sequential portions of the record, said apparatus further comprising an indicating device coupled to the rotary device for indicating the position of the rotary device relative to the record.

3. Apparatus for reading a planar magnet record of constant width comprising means adapted for supporting the record in a fixed plane, a rotary device defining an axis of rotation normal to said plane, a plurality of magnetic heads on the rotary device for rotation therewith adjacent the record, the heads being equally spaced at a distance corresponding to the width of the record so that one head commences to scan the record as another head finishes scanning the record, and means for moving the rotary device transversely to the width of the record to enable the scanning of sequential portions of the record, the heads being supported so that their respective distances from the plane are adjustable, and guide means coupled to the rotary device for controlling the spacing of the heads from the plane.

4. A magnetic sound record reading machine for use in conjunction with a magnetic sound record sheet having visual descriptions on its front surface and magnetic sound record film on its back surface, the machine comprising a support including a panel defining a window opening and a transparent pressing plate hinged on said panel, a rotary body, a plurality of magnetic sound recording and reproducing heads on the periphery of the rotary body and arranged at equal intervals corresponding to the width of the magnetic coating film, a longitudinally shiftable table rotatably supporting the rotary body and shiftable longitudinally of the film together with the rotary body, a screw shaft coupled to the table, a motor coupled to and driving said screw shaft, said screw shaft shifting the table in slow motion and returning the table with a rapid motion, an arc shape guide fixed on the shiftable table along the periphery of the rotary body to guide the heads selectively away from the magnetic coating film so that only one head is maintained adjacent the magnetic coating film as the rotary body is rotated, and an indication device coupled to and showing the position of the shiftable table relative to the film.

5. A magnetic sound record reading machine according to claim 4, wherein the panel includes guide pins adapted to engage the magnetic sound record sheet and holding plates hinged on the panel thereby to secure the engagement between the guide pins and the sheet.

6. A magnetic sound record machine according to claim 4, wherein the panel includes a scale adjacent the indication device to show the position of the shiftable table.

7. A magnetic sound record reading machine according to claim 4, wherein the panel includes a slidable frame on which the magnetic sound record sheet is mountable and means coupled to the frame whereby its position can be adjusted in relation to the heads on the rotary body, said means including a rack fixed on the slidable frame, a pinion engaging the rack, and a knob for controlling the pinion whereby the relative position between the heads and the magnetic sound record film can be maintained correctly despite elongation and shrinkage of the sheet.

8. A magnetic sound record readnig machine according to claim 4, comprising a device for automatically bringing one of the magnetic sound recording and reproducing heads to an edge of the magnetic sound record, said device comprising a disc integral with the rotary body and having an inclined side surface in a truncated conical shape provided with notches; a governor fixed on the machine in correspondence to the edge and including a roller, a vertically movable sleeve supporting the roller, and a motor operated with the slidable table at said edge; the roller engaging the inclined surface of the disc to turn the disc together with the rotary body until the roller enters the notch where it idles thereby positioning one of the sound recording and reproducing heads at said edge.

9. A magnetic sound record reading machine according to claim 4, comprising members adjustably fixed on the machine to determine the limits of the longitudinal motion of the shiftable table, said members including switches engageable by the shiftable table to control said motor.

10. A magnetic sound record reading machine according to claim 4, wherein the rotary body includes a concentric member rotatably mounted thereon and comprising arms and de-magnetizing heads fixed on the arms in correspondence with the magnetic sound recording heads of the rotary body, said machine further comprising projections on the heads whereby one of the de-magnetizing heads is brought to a position preceding the associated magnetic sound recording head by contact between the arm and one of the projections whereby erasure can be effected before the recording of new sound.

11. A magnetic sound record reading machine according to claim 4, comprising elastic means for fixing the heads on the rotary body and urging the heads toward the film, the heads each including a projection for contacting the guide to urge the heads selectively away from the sheet.

12. A magnetic sound record reading machine according to claim 4, comprising a circular pressing lever mounted movably on the shiftable table, and an electromagnet for engaging the pressing lever to actuate the same to engage and displace the heads whereby the magnetic sound record sheet can be spaced from all of the heads.

13. A magnetic sound record reading machine according to claim 4, comprising a worm wheel engaging and driving the rotary body, a worm engaging the work wheel, and gears coupling said screw shaft to said worm and driving said worm only when the screw shaft shifts the shiftable table in predetermined direction.

14. A magnetic sound record reading machine according to claim 4, comprising a friction wheel for driving the rotary body; a driving shaft for driving the friction wheel, driving wheels of different diameters on the driving shaft and selectively engageable with said friction wheel, a linking device for selecting one of said driving wheels, a knob controlling the linking device, and means coupling the knob to the driving shaft for reversing the direction of rotation of the same.

15. A magnetic sound record reading machine according to claim 4 comprising a de-magnetizing circuit for de-magnetizing the film, and a switch selectively engageable by the film, the switch being coupled in the circuit for selectively preventing de-magnetization of the film.

References Cited in the file of this patent

UNITED STATES PATENTS

| | | |
|---|---|---|
| 2,245,286 | Marzocchi | June 10, 1941 |
| 2,511,892 | Wise | June 20, 1950 |
| 2,750,449 | Thompson et al. | June 12, 1956 |
| 2,772,328 | Lyon | Nov. 27, 1956 |

FOREIGN PATENTS

| | | |
|---|---|---|
| 674,570 | Great Britain | June 25, 1952 |
| 1,107,292 | France | Aug. 3, 1955 |